(12) United States Patent
Park et al.

(10) Patent No.: US 9,632,520 B2
(45) Date of Patent: Apr. 25, 2017

(54) METHOD FOR CONTROLLING VOLTAGE BASED ON TEMPERATURE AND TERMINAL SUPPORTING THE SAME

(71) Applicant: Samsung Electronics Co. Ltd., Suwon-si, Gyeonggi-do (KR)

(72) Inventors: Chulwoo Park, Suwon-si (KR); Chuleun Yun, Hwaseong-si (KR); Kwangsub Lee, Yongin-si (KR); Seyoung Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 14/039,772

(22) Filed: Sep. 27, 2013

(65) Prior Publication Data

US 2014/0091624 A1    Apr. 3, 2014

(30) Foreign Application Priority Data

Sep. 28, 2012 (KR) .......................... 10-2012-0109155

(51) Int. Cl.
*G05F 3/08* (2006.01)
*G06F 1/20* (2006.01)
*G06F 1/32* (2006.01)

(52) U.S. Cl.
CPC ............. *G05F 3/08* (2013.01); *G06F 1/206* (2013.01); *G06F 1/324* (2013.01); *G06F 1/3287* (2013.01); *G06F 1/3296* (2013.01); *Y02B 60/1217* (2013.01); *Y02B 60/1275* (2013.01); *Y02B 60/1282* (2013.01); *Y02B 60/1285* (2013.01); *Y10T 307/406* (2015.04)

(58) Field of Classification Search
CPC .......... G05F 3/08; G06F 1/324; G06F 1/3287; G06F 1/3296
USPC .......................................................... 307/31
See application file for complete search history.

(56) References Cited

U.S. PATENT DOCUMENTS

| 5,623,195 | A | 4/1997 | Bullock et al. |
| 6,262,392 | B1 * | 7/2001 | Morton ..................... H05B 3/00 219/209 |
| 2004/0130357 | A1 * | 7/2004 | Smith ................ H03K 19/0016 327/102 |
| 2008/0098254 | A1 | 4/2008 | Altevogt et al. |
| 2011/0004774 | A1 | 1/2011 | Hansquine et al. |
| 2011/0283117 | A1 * | 11/2011 | Krig ........................ G06F 1/206 713/300 |
| 2012/0049933 | A1 | 3/2012 | Riechel et al. |
| 2012/0271481 | A1 * | 10/2012 | Anderson ............... G06F 1/206 700/299 |

(Continued)

FOREIGN PATENT DOCUMENTS

| CN | 1115048 A | 1/1996 |
| CN | 10151726 A | 11/2009 |

(Continued)

*Primary Examiner* — Hal Kaplan
*Assistant Examiner* — Toan Vu
(74) *Attorney, Agent, or Firm* — Jefferson IP Law, LLP

(57) ABSTRACT

A method for controlling a voltage based on a temperature and a terminal supporting the same are provided. The terminal includes a temperature sensor for detecting a temperature of at least one location of the inside and of the outside of at least one system and a voltage control unit for adjusting the voltage supplied to the at least one system according to the temperature detected by the temperature sensor.

16 Claims, 11 Drawing Sheets

(56) References Cited

U.S. PATENT DOCUMENTS

2013/0016035 A1\* 1/2013 Ikeda ................ H01L 27/14601
345/92
2013/0117582 A1\* 5/2013 Satyamoorthy ......... G06F 1/324
713/300

FOREIGN PATENT DOCUMENTS

CN 102473030 A 5/2012
WO 2011/003083 A1 1/2011

\* cited by examiner

FIG. 7

| Test Title | Item | Frequency | | | | | | | | | | | | | | | |
|---|---|---|---|---|---|---|---|---|---|---|---|---|---|---|---|---|
| | | L0 | L1 | L2 | L3 | L4 | L5 | L6 | L7 | L8 | L9 | L10 | L11 | L12 | L13 | L14 | L15 |
| LVCC ARM | Supply Voltage | 1175.0 | 1137.5 | 1087.5 | 1050.0 | 1025.0 | 987.5 | 962.5 | 937.5 | 912.5 | 900.0 | 900.0 | 900.0 | 900.0 | 900.0 | 887.5 | 887.5 |
| | AMBIENT Temp. | 1000 | 962.5 | 937.5 | 900 | 862.5 | 862.5 | 812.5 | 787.5 | 762.5 | 737.5 | 712.5 | 687.5 | 650 | 637.5 | 625 | 637.5 |
| | COLD Temp. | 1037.5 | 1000 | 962.5 | 937.5 | 912.5 | 900 | 850 | 825 | 800 | 775 | 737.5 | 712.5 | 700 | 687.5 | 662.5 | 700 |
| | Additional Margin | 37.5 | 37.5 | 25 | 37.5 | 50 | 37.5 | 37.5 | 37.5 | 37.5 | 37.5 | 25 | 25 | 50 | 50 | 37.5 | 62.5 |
| LVCC INT | Supply Voltage | 950 | 912.5 | 900 | 900 | 887.5 | | | | | | | | | | | |
| | AMBIENT Temp. | 787.5 | 762.5 | 762.5 | 875 | 650 | | | | | | | | | | | |
| | COLD Temp. | 825 | 800 | 800 | 712.5 | 687.5 | | | | | | | | | | | |
| | Additional Margin | 37.5 | 37.5 | 37.5 | 37.5 | 37.5 | | | | | | | | | | | |
| LVCC G3D | Supply Voltage | 1125.5 | 1050 | 1012.5 | 975 | 900 | 900 | 900 | | | | | | | | | |
| | AMBIENT Temp. | 900 | 837.5 | 800 | 762.5 | 712.5 | 637.5 | 612.5 | | | | | | | | | |
| | COLD Temp. | 925 | 875 | 837.5 | 800 | 750 | 712.5 | 662.5 | | | | | | | | | |
| | Additional Margin | 25 | 37.5 | 37.5 | 37.5 | 37.5 | 75 | 50 | | | | | | | | | |

FIG. 11

| ITEM | IDS | HPM | ASV | POWER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|---|---|
| #1 | 11 | 10 | ASV3 | ARM | 12.5 | 25 | 25 | 37.5 | 37.5 | 25 | 37.5 | 37.5 | 37.5 | 37.5 | 50 | 37.5 | 37.5 | 37.5 | 50 | 37.5 |
|  |  |  |  | INT | 25 | 25 | 25 | 25 | 37.5 |  |  |  |  |  |  |  |  |  |  |  |
|  |  |  |  | G30 | 25 | 25 | 25 | 37.5 | 37.5 | 38 | 37.5 | 25 | 37.5 | 37.5 | 37.5 | 37.5 | 25 | 50 | 50 | 50 |
| #2 | 20 | 15 | ASV7 | ARM | 25 | 75 | 25 | 37.5 | 25 | 37.5 | 25 |  |  |  |  |  |  |  |  |  |
|  |  |  |  | INT | 25 | 25 | 25 | 37.5 | 37.5 | 50 | 37.5 |  | 50 |  |  |  |  |  |  |  |
|  |  |  |  | G30 | 37.5 | 37.5 | 12.5 | 37.5 | 37.5 | 37.5 | 37.5 | 25 | 50 | 37.5 | 37.5 | 37.5 | 25 | 37.5 | 25 | 25 |
| #3 | 24 | 17 | ASV8 | ARM | 25 | 25 | 25 | 37.5 | 25 | 50 | 25 | 25 | 37.5 | 37.5 | 37.5 | 37.5 | 12.5 | 37.5 | 25 |  |
|  |  |  |  | INT | 37.5 | 37.5 | 12.5 | 37.5 | 37.5 | 37.5 | 50 | 37.5 | 50 | 37.5 | 37.5 | 37.5 | 37.5 | 37.5 | 50 | 25 |
|  |  |  |  | G30 | 12.5 | 12.5 | 25 | 37.5 | 25 | 37.5 | 37.5 | 37.5 | 37.5 | 37.5 | 25 | 37.5 | 25 | 50 | 50 | 50 |
| #4 | 22 | 16 | ASV7 | ARM | 37.5 | 25 | 25 | 37.5 | 25 | 37.5 | 37.5 | 37.5 | 37.5 | 37.5 | 37.5 | 37.5 | 37.5 | 50 | 50 | 50 |
|  |  |  |  | INT | 37.5 | 37.5 | 37.5 | 37.5 | 50 | 12.5 | 50 |  |  |  |  | 25 | 50 |  |  |  |
|  |  |  |  | G30 | 37.5 | 37.5 | 37.5 | 37.5 | 37.5 |  | 50 |  |  |  |  |  |  |  |  |  |
| #5 | 30 | 18 | ASV8 | ARM | 25 | 37.5 | 37.5 | 37.5 | 37.5 | 75 | 50 |  |  |  |  |  |  |  |  |  |
|  |  |  |  | INT | 37.5 | 37.5 | 37.5 | 37.5 |  |  |  |  |  |  |  |  |  |  | 37.5 |  |
|  |  |  |  | G30 | 25 | 37.5 | 37.5 | 37.5 |  |  |  |  |  |  |  |  |  | 50 |  |  |

METHOD FOR CONTROLLING VOLTAGE BASED ON TEMPERATURE AND TERMINAL SUPPORTING THE SAME

PRIORITY

This application claims the benefit under 35 U.S.C. §119(a) of a Korean patent application filed on Sep. 28, 2012 in the Korean Intellectual Property Office and assigned Serial No. 10-2012-0109155, the entire disclosure of which is hereby incorporated by reference.

BACKGROUND OF THE INVENTION

1. Field of the Invention

The present invention relates to a voltage control based on a temperature for a system. More particularly, the present invention relates to a method for controlling a voltage based on a temperature and a terminal supporting the same including a control unit for controlling each component of the terminal or for controlling the terminal as a whole.

2. Description of the Related Art

Recently, portable terminals have been widely used on the basis of mobility. In particular, mobile communication terminals enabling voice communication are very popular among the portable terminals, and are used by most people. Mobile communication terminals transmit communication information between callers and support various functions. For example, a conventional portable terminal has an MPEG-1 or MPEG-2 Audio Layer III (MP3) function for playing of a file, and an image collecting function like a digital camera. Conventional terminals further support functions for performing a mobile game or an arcade game.

Portable terminals are not equipped with a cooler for dissipating heat generated during usage in order to secure ease of portability. Accordingly, portable terminals have a weak point in dissipating heat as compared to terminals having a cooler, such as a desktop terminal or a notebook terminal. Conventional portable terminals experience a problem if a system temperature is increased to a temperature higher than a specific level. In order to solve the above problem, a method of manufacturing the components of portable terminals with a material having a high heat-resisting property has been sought. However, it is not easy to determine such a material, and the material may have a high cost or may be unsuitable for manufacturing the portable terminal.

Therefore, a need exists for a method for controlling voltage based on a temperature of a mobile terminal, and a mobile terminal capable of supporting the method.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for controlling a voltage based on a temperature and a terminal supporting the same, thus enabling reduction of heat generation through a voltage control according to the temperature.

Another aspect of the present invention is to provide a method for controlling a system voltage based on a temperature and a terminal supporting the same, thus enabling an increase of battery lifetime as well as maintaining a uniform performance by saving the power through a voltage control.

Another aspect of the present invention is to provide a method for controlling a voltage based on a temperature and a terminal supporting the same, thus supporting to compensate for deviations between samples of control devices.

In accordance with an aspect of the present invention, a terminal supporting a voltage control based on a temperature is provided. The terminal includes a temperature sensor for detecting a temperature of at least one location of the inside and of the outside of at least one system, and a voltage control unit for adjusting the voltage supplied to the at least one system according to the temperature detected by the temperature sensor.

In accordance with another aspect of the present invention, a method for controlling a voltage based on a temperature is provided. The method includes detecting a temperature of at least one location of the inside and of the outside of at least one system, and adjusting the voltage supplied to the at least one system according to the detected temperature.

As described above, the method for controlling a voltage based on a temperature and the terminal supporting the same decreases heat generation by decreasing the voltage to a predefined value if the temperature of the system increases due to continued driving of the system.

Such a characteristic increases an operation time of the system and increases the duration of high performance by reducing a temperature increase through a decrease of heat generation.

The present invention further increases a battery lifetime by maintaining a driving power at a lower level through a voltage reduction according to the system temperature.

The present invention further enables for the correction of deviations between samples for each system in a process of manufacture.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description in conjunction with the accompanying drawings, in which:

FIG. 7 is a table showing voltage margins for a voltage control based on a temperature according to an exemplary embodiment of the present invention;

FIG. 11 is a table showing a test result of measuring temperature voltage margins of ASV groups according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Some components in the accompanying drawings may be exaggerated, omitted or schematically illustrated, and the size of each component may not reflect the actual size. Accordingly, exemplary embodiments of the present invention are not limited by relative size or distance illustrated in the accompanying drawings.

Figure 1:
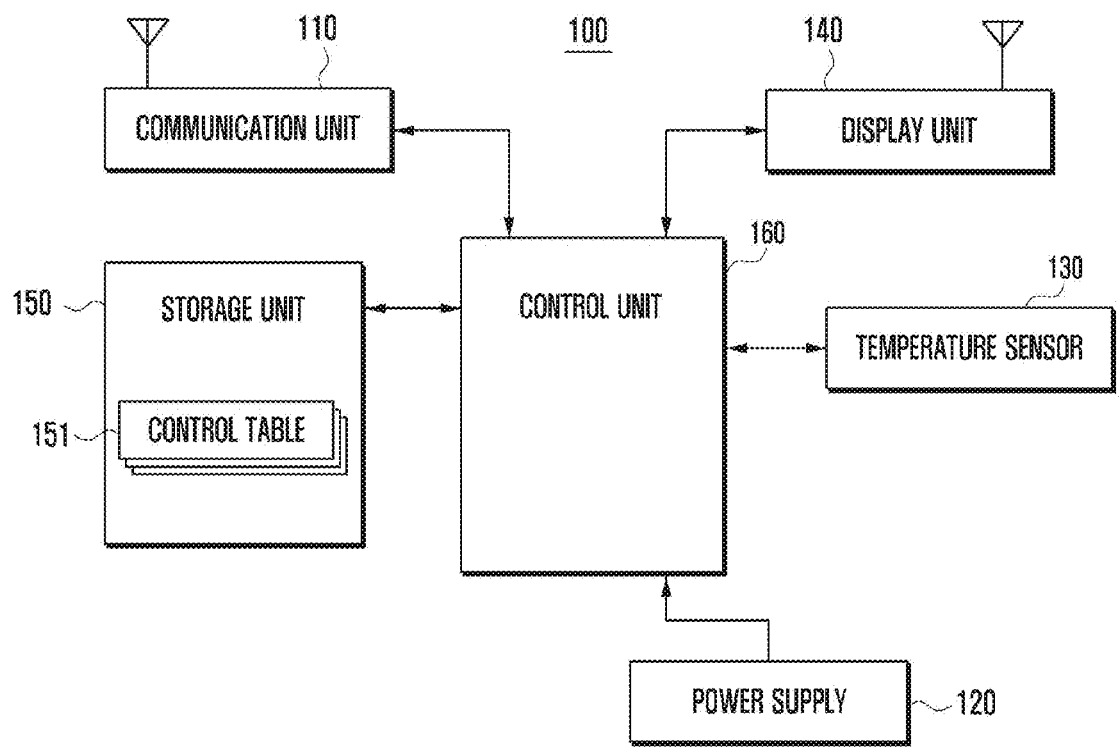
FIG. 1 is a block diagram showing a schematic configuration of a terminal supporting a differential power supply function for a system based on a temperature according to an exemplary embodiment of the present invention.

FIG. 1 is a block diagram showing a schematic configuration of a terminal supporting a differential power supply function for a system based on a temperature according to an exemplary embodiment of the present invention.

Referring to FIG. 1, the terminal 100 according to an exemplary embodiment of the present invention includes a communication unit 110, power supply 120, temperature sensor 130, display unit 140, storage unit 150, and control unit 160.

For driving the control unit 160, the terminal 100 applies a drive frequency based on a predefined control table, identifies a temperature of a drive system of the terminal (for example, a temperature of an Application Processor (AP) configured in the control unit 160), and applies a specific control table corresponding to the temperature. The control table supports to apply a lower voltage according to the increase of temperature. This characteristic resultantly supports the control unit 160 by using a specific drive frequency to drive more stably and for a longer period by maintaining the system temperature in a steady state or by minimizing the increase of system temperature by supplying a relatively lower voltage.

In exemplary embodiments, the temperature sensor 130 detects a temperature at a predetermined location of the terminal 100. Namely, the temperature sensor 130 may include at least one of a temperature sensor disposed at a specific location of a Printed Circuit Board (PCB) inside the terminal 100, a temperature sensor disposed inside a controller of the control unit 160 or adjacent to the controller, and a temperature sensor disposed adjacent to various controllers or inside the controller for supporting a specific user function of the terminal 100. The temperature sensor 130 may transmit collected temperature information to the control unit 160. The temperature sensor disposed inside the control unit 160 may be located adjacent to an AP core chip of the control unit 160, and may detect a temperature generated by heat according to an electric current of an AP drive. If a multichip (for example, a communication module chip for supporting a communication function) is additionally disposed in the control unit 160, the temperature sensor 130 may be disposed in an adjacent area of the corresponding communication module chip, and may detect temperature information. Alternatively, the temperature sensor 130 may be disposed in a common area of the AP chip and the communication module chip, and detects temperature information. The temperature sensor may further be disposed in controllers for supporting user functions (for example, image data processing unit (ISP) or graphics supporting device). As described above, in exemplary embodiments of present invention, at least one of the temperature sensors 130 is disposed and detects temperature information according to the design of the terminal 100 so that a differential voltage supply function based on a temperature can be applied to at least one of various systems in the terminal 100.

The communication unit 110 is an additional component corresponding to the communication module chip described above if the terminal 100 supports a communication function. Namely, the communication unit 110 may be omitted if the terminal 100 does not support the communication function. The communication unit 110 supports the communication function through an activation according to a user's request, a predetermined schedule, or an external request. In a procedure of driving the communication unit 110, the communication unit 110 outputs or receives a signal. For this, the communication unit 110 supports a predetermined voltage for driving the communication module chip under the control of the control unit 160. If the communication unit 110 is driven, heat may be generated. Such heat may increase an internal temperature of the terminal 100, and the control unit 160 may perform a drive frequency management so that the voltage changes according to the temperature increase generated by driving the communication unit 110. The communication module chip is a component related to the communication function, and may include not only the communication chip supporting telecommunication and data communication functions but also a broadcast receiving module and a near field communication module.

The power supply 120 is a component required for supplying an electric power to the terminal 100. The power supply 120 supplies an electric power having a predetermined voltage to each component of the terminal 100 under the control of the control unit 160. In particular, the power supply 120 may supply an electric power having a voltage lower than a previous voltage according to the internal temperature of the terminal 100 or according to an increase of a specific system temperature under the control of the control unit 160. For example, if the power supply 120 has supplied an electric power of 5.0 volt to control unit 160 before a specific temperature increase, the power supply 120 may supply an electric power of 3.0 volt to the control unit 160 after the temperature increase. The power supply 120 may further supply an electric power of 2.5 volt to the control unit 160 after an additional temperature increase. Namely, the power supply 120 can supply electric powers having various voltages to the control unit 160 according to the temperature.

The display unit 140 is a component outputting various screens according to the operation of the terminal 100. The display unit 140 displays a screen such as a waiting screen and a menu screen according to the operation of the terminal 100, and a specific user function screen such as a file play screen, a file search screen, a broadcast receiving screen, and a web connecting screen, according to the user's selection or to a predetermined schedule. The display unit 140 may be configured with a touch screen having a touch panel and a display panel, and thereby may be used as an input means.

The display unit 140 may provide information so that a user or designer can identify the differential voltage supply function based on a temperature according to exemplary embodiments of the present invention. Namely, the display unit 140 may display a temperature of an internal temperature of the terminal 100 or a temperature of a specific system at a side of the screen. Here, the display unit 140 may support so that related temperature information is easily identified by displaying a type of temperature information and a temperature value. The temperature value may be displayed in Celsius or Fahrenheit according to a setting. The display unit 140 may further provide a change of the voltage value applied by temperature information. The change of the voltage value may be supported by displaying a voltage value of a previous temperature and a voltage value of the current temperature so that the extent of voltage change can be identified. The display unit 140 may further output drive frequency information of a specific system configuration. Accordingly, the display unit 140 may display a change of a battery lifetime according to the change of voltage value and a change of drive frequency according to the change of temperature. The output of information may be related to an internal situation of the system, and thereby may be omitted according to the user's setting or designer's intention.

The storage unit 150 stores various programs related to the driving of the terminal 100. The storage unit 150 may store an operating system of the terminal 100, program of specific user function such as a camera application program, communication function support program, and broadcast receiving program. The camera application program may be added if the terminal 100 supports a camera function. In particular, the storage unit 150 stores a plurality of control tables 151 to support the differential voltage supply function based on a temperature.

The plurality of control tables 151 may be a table designed to apply a different voltage to a specific system based on a temperature. The plurality of control tables 151 may be a plurality of Dynamic Voltage Frequency Scaling (DVFS) tables having different voltage values for each temperature if a system supports a DVFS function for the operation of the system. The DVFS is a table supporting a system, such as an AP core, to set a voltage value according to a frequency value required instantaneously. If a lot of tasks have to be executed or high-speed data processing is required for the task in driving the terminal 100, the AP core operates in a relatively high drive frequency (for example, the maximum drive frequency applicable to a system) based on the DVFS table, and may use the maximum voltage value for this. If a few tasks have to be executed or low-speed data processing is required for the task in driving the terminal 100, the AP core operates at a relatively low drive frequency (for example, the minimum drive frequency applicable to a system) based on the DVFS table, and may use the minimum voltage value for this.

The plurality of control tables 151 may be provided individually for each system. For example, not only the control tables for the AP core but also control tables for an image data processing unit driving a camera and control tables for a communication module such as a broadcast receiving module may be provided. Namely, the plurality of control tables 151 may include control tables for at least one voltage control based on a temperature in systems using a drive frequency in a specific clock.

The control unit 160 performs processing and transmitting various signals and data related to the driving of the terminal 100. In particular, the control unit 160 may identify temperature information collected by the temperature sensor 130, and may change the drive frequency and the voltage according to the temperature information, for supporting a differential voltage supply function based on a temperature. The control unit 160 provides an optimum voltage value in the operation with a specific drive frequency by applying a different voltage value to the drive frequency. The stability of the system is improved by saving electric power and by minimizing heat generation in the operation of the terminal 100 with a specific drive frequency, and thereby more stable and higher drive performance of the terminal 100 is provided. The control unit 160 may further support the differential voltage supply function based on a temperature for other systems included in the terminal 100 by using the control table 151 pre-stored in the storage unit 150. Alternatively, if a routine for using the differential voltage supply function based on a temperature is loaded in each system component, like the control unit 160, an access and operation of control tables 151 in the storage unit 150 for operating a corresponding function may independently be performed without the control of the control unit 160. The control unit 160 may include a configuration shown in FIG. 2.

Figure 2:
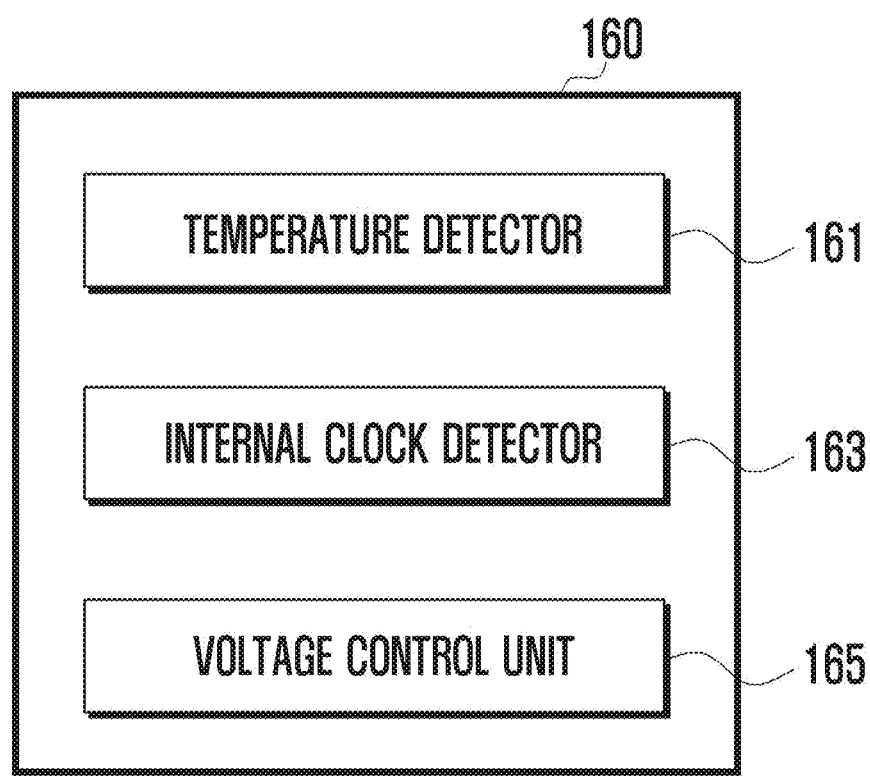
FIG. 2 is a block diagram showing a configuration of the control unit of FIG. 1 according to an exemplary embodiment of the present invention.

FIG. 2 is a block diagram showing a configuration of the control unit of FIG. 1 according to an exemplary embodiment of the present invention.

Referring to FIG. 2, control unit 160 includes a temperature detector 161, internal clock detector 163, and voltage control unit 165.

The temperature detector 161 detects an internal temperature of the terminal 100, and detects at least one temperature of systems disposed on a PCB such as a control unit 160, a graphics supporting device for the operation of the display unit 140, a bus system for transmitting signals between internal system components, an internal logic, and an image data processing unit for supporting a camera. For this, the temperature detector 161 controls at least one temperature sensor 130 disposed in the above systems and collects temperature information of a specific system by using the temperature sensor 130. The temperature detector 161 may collect the temperature information periodically or in real time by using the temperature sensor 130, and may collect only the temperature information of a specific system disposed in the terminal 100 or the internal temperature of the entire terminal 100. The temperature detector 161 transmits the temperature information received from the temperature sensor 130 to the voltage control unit 165. The temperature information may include a location identifier of a specific system or of the terminal 100 and a temperature value.

The internal clock detector 163 is a component for detecting at least one system clock supporting a differential voltage supply function based on a temperature according to an exemplary embodiment of the present invention. For example, the internal clock detector 163 may detect the drive frequency of the control unit 160. In the case that DVFS (or Dynamic Clock and Voltage Scaling (DCVS)) is applied to a control unit 160, the control unit 160 can be operated based on various drive frequencies depending on an operation of the terminal 100 as described above. The internal clock detector 163 detects a drive frequency at a specific temperature, and transmits it to the voltage control unit 165. The internal clock detector 163 further detects a fixed drive frequency for a component not applied by the DVFS, such as an image data processing unit for supporting a camera module, and the detected information is transmitted to the voltage control unit 165.

The voltage control unit 165 is a component for adjusting a voltage supplied to a specific system according to the temperature information detected by the temperature detector 161. If the temperature information is received, the voltage control unit 165 identifies a control table 151 corresponding to the temperature information from the storage unit 150, and increases or decreases the voltage according to the information stored in the control table 151. In the case of a controller applied by the DVFS, the voltage control unit 165 searches a DVFS control table corresponding to the current temperature from a plurality of DVFS control tables based on a temperature in the storage unit 150. The voltage control unit 165 then performs a voltage control according to the drive frequency defined in the DVFS control table by using the drive frequency information transmitted from the internal clock detector 163. Namely, the voltage control unit 165 controls a voltage to be supplied to a specific system referring to temperature information and a drive frequency.

As an example of the above differential voltage supply function, if the control unit 160 operates at the maximum drive frequency, the internal temperature of the terminal 100 and the temperature of a system included in the control unit 160 may increase gradually. In this situation, the temperature detector 161 may detect an increase of internal temperature or of system temperature, and may transmit the temperature information to the internal clock detector 163 and the voltage control unit 165 if the temperature increases higher than a predefined value. The internal clock detector 163 identifies system drive frequency information in the state that the temperature is higher than the predefined value, and transmits it to the voltage control unit 165. The voltage control unit 165 searches a control table 151 stored in the storage unit 150 if the temperature increases, and looks up the control table 151 corresponding to the temperature. The voltage control unit 165 then identifies a drive frequency received from the internal clock detector 163 and detects voltage information corresponding to the drive frequency. The voltage control unit 165 adjusts a voltage supplied to the control unit 160 based on the corresponding voltage information. For example, the voltage control unit 165 may control to decrease the voltage supplied to a controller of the control unit 160 to a predetermined value. If the voltage supplied to the control unit 160 is decreased in this process, heat generation may be resultantly reduced according to the decrease of power consumption in the operation of the control unit 160. This characteristic gives a result that the system is operated at the same drive frequency without changing to a drive frequency lower than the maximum drive frequency by the control unit 160. Accordingly, the system applied by the differential voltage supply function based on a temperature according to exemplary embodiments of the present invention may provide a relatively high drive performance, and the lifetime of the system may extended by minimizing a thermal damage of hardware through the suppression of temperature increase. Additionally, the system applied by exemplary embodiments of the present invention may reduce the voltage adaptively, and thereby enable a high performance operation with a low electric power by reducing the power consumption, and produce a longer operation time by saving battery power.

Figure 3:
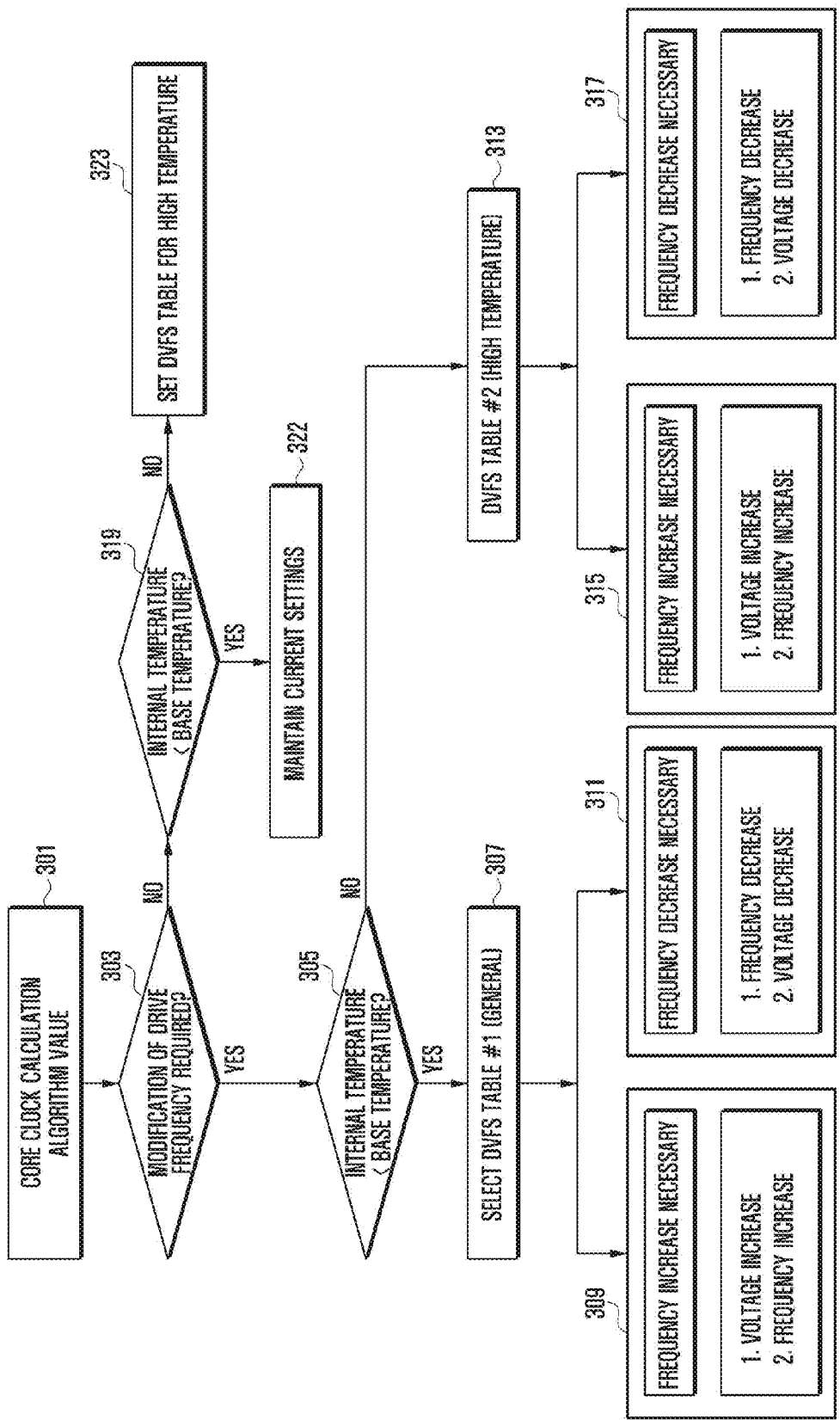
FIG. 3 is a flowchart showing a procedure for controlling a system voltage based on a temperature according to an exemplary embodiment of the present invention.

FIG. 3 is a flowchart showing a procedure for controlling a system voltage based on a temperature according to an exemplary embodiment of the present invention.

Referring to FIG. 3, the control unit 160 identifies a value of system core clock calculation algorithm in step 301. Namely, the control unit 160 identities the number of tasks to be processed currently and a requested processing speed. The control unit 160 then identifies whether changing a drive frequency is necessary according to identified information in step 303. If changing a drive frequency is necessary, the control unit 160 identifies whether an internal temperature of a system, such as an AP, to be applied by exemplary embodiments of present invention is lower than a predefined base temperature in step 305. Here, the temperature information for controlling the voltage of the AP may be collected not from the inside of the AP but from the outside of the AP (for example, temperature sensor disposed on a PCB) according to the arrangement of the temperature sensor.

In exemplary embodiments, if the internal temperature of the AP is lower than the base temperature in step 305, the control unit 160 selects a DVFS table #1 (general) in step 307, and adjusts the AP drive frequency and the voltage based on the DVFS table #1 in steps 309 and 311. Here, the DVFS table #1 (general) may correspond to a first control table predefined for the operation of the AP. Namely, the DVFS table #1 may be a table including information for a dynamic voltage adjustment according to DVFS frequency scaling.

The control unit 160 controls to increase the voltage and the drive frequency by a predefined value based on the DVFS table #1 if an increase of frequency is necessary in step 309. The control unit 160 controls to decrease the voltage and the drive frequency if a decrease of frequency is necessary in step 311.

In exemplary embodiments, if the internal temperature of the AP is higher than the base temperature in step 305, the control unit 160 selects a DVFS table #2 (high temperature) stored in the storage unit 150 in step 313, and controls to selectively perform step 315 and step 317. Namely, based on the information included in the DVFS table #2, the control unit 160 may increase the voltage and the frequency if an increase of frequency is necessary, and decrease the voltage and the frequency if a decrease of frequency is necessary. In the above description, voltage adjustment values included in the DVFS table #1 and voltage adjustment values included in the DVFS table #2 are at least partially set to different values.

In exemplary embodiments, if a change of the drive frequency is unnecessary according to the identified information in step 303, the control unit 160 identifies whether the internal temperature of the AP is lower than the predefined temperature in step 319. If the internal temperature of the AP is lower than the predefined base temperature, the control unit 160 maintains the current settings in step 322. Namely, the control unit 160 supports the AP drive without changing the current drive frequency and voltage. If the internal temperature of the AP is higher than the predefined base temperature in step 319, the control unit 160 performs an AP adjustment according to the setting of the DVFS table for a high temperature in step 323. In the above description, if the internal temperature of the AP is higher than the predefined temperature in step 319, step 323 is performed similar to step 313. In the above description, identifying the necessity of changing a drive frequency of an AP configuration and accordingly changing an internal temperature of AP and a base temperature have been explained, however steps 303, 319, 322, and 323 may be omitted. In this case, the control unit 160 identifies a value of core clock algorithm in step 301, compares an internal temperature of AP with the base temperature in step 305, and maintains the current settings in step 322 if the internal temperature of AP is lower than the base temperature, without entering step 307. Branches are shown to explain adjustment of drive frequency and voltage in FIG. 3, however the major characteristic of exemplary embodiments of the present invention lies in adjusting a drive frequency and a voltage based on a specific DVFS table selected from a plurality of predefined DVFS tables if an internal or external temperature of a system is higher than a base temperature.

A method of adjusting a voltage by using two DVFS tables has been described above, however the present invention is not limited to this.

Figure 4:
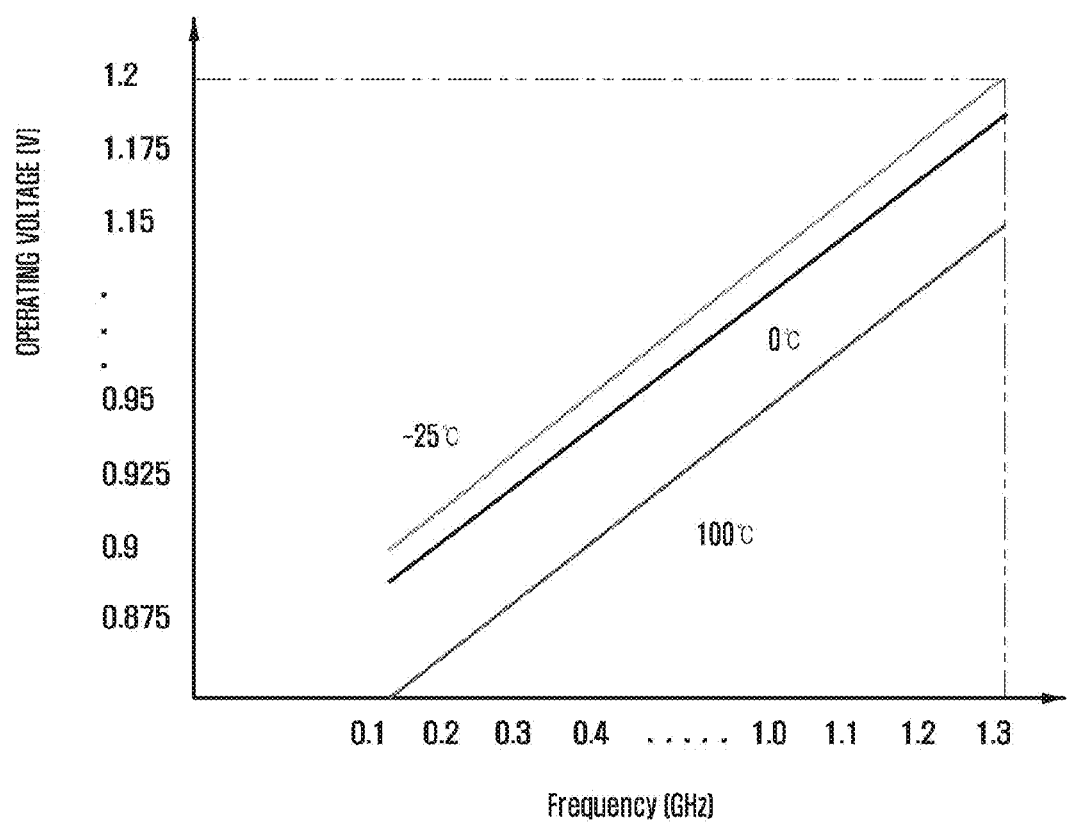
FIG. 4 is a graph showing a frequency and voltage control according to a temperature change according to an exemplary embodiment of the present invention.

FIG. 4 is a graph showing a frequency and voltage control according to a temperature change according to an exemplary embodiment of the present invention.

Referring to FIG. 4, a plurality of DVFS tables for each temperature may be provided in exemplary embodiments of the present invention as shown, and thereby the terminal 100 can control to apply a voltage adjustment value corresponding to a drive frequency by searching a corresponding DVFS table for each temperature. The voltage adjustment values for each frequency are shown at temperatures 0° C., −25° C., and 100° C. in FIG. 4. FIG. 4 shows adjusting an operation voltage for each temperature in a linear form, however, the operation voltage may be adjusted in a non-linear form, such as a parabolic curve and a step curve.

Products such as a desktop computer and a notebook computer cool down the system and maintain the performance by installing a heat sinking plane and a rotating fan. However, a portable terminal cannot install such a cooling device because of the effect on portability and due to its slim size, and thereby a method for reducing a power consumption is required.

If an electric power with constant voltage and current is supplied to a system, heat generates, and thereby a threshold voltage (Vth) is decreased due to the generated heat. If the Vth is decreased, leakage and dynamic currents of a chip are increased, and thereby the heat generates more and more by the increased current. As the Vth is decreased according to the increase of the chip temperature, an exemplary embodiment of the present invention reduces a power consumption by reducing the applied voltage by a voltage margin. Accordingly, a system applied by exemplary embodiments of the present invention comes to have a lower temperature increase and a longer time of maintaining the maximum performance.

As described above, the terminal 100 is characterized to support a differential voltage supply function based on a temperature for at least one of several possible specific systems, such as devices configured in the control unit 160, a controller such as an image Signal Processor (ISP) supporting a camera function, a graphics device supporting a display function, and the like. The differential voltage supply function based on a temperature supports a high drive performance and high stability for a long period. The differential voltage supply function based on a temperature enables reducing the deviations of sample properties in a manufacturing process of each system for the terminal 100, and thereby the management of products can be performed more freely. Hereafter, a method of applying the functions according to exemplary embodiments of the present invention is described in more detail referring to the attached drawings.

Figure 5:
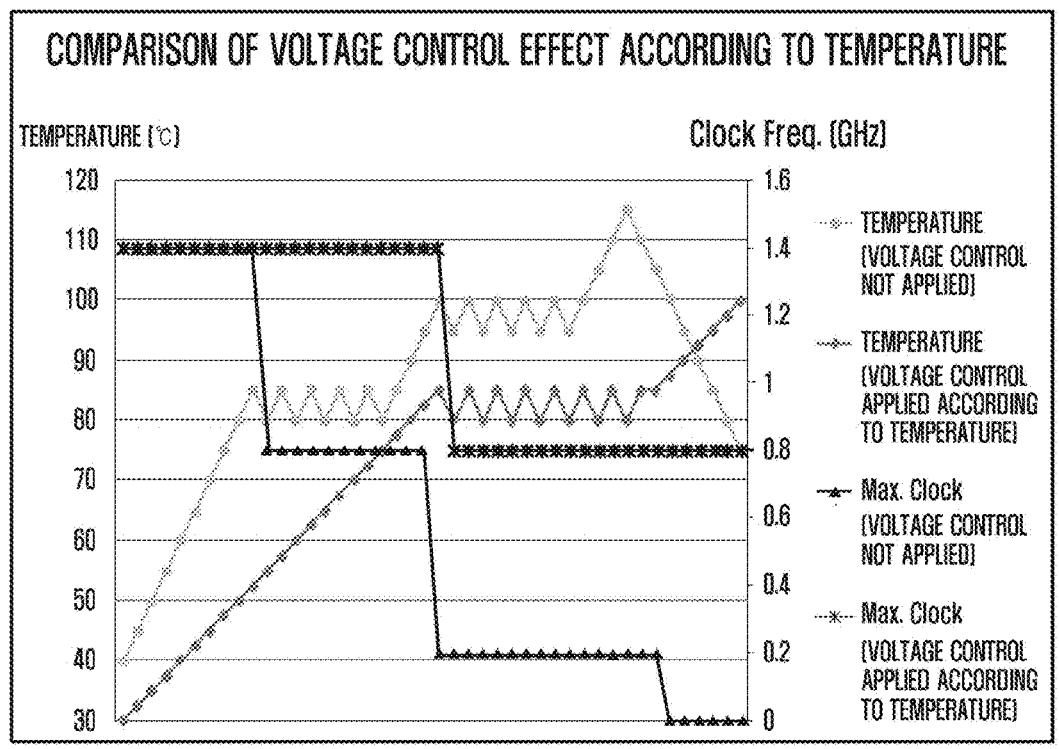
FIG. 5 is a graph showing a performance comparison between a voltage control based on a temperature according to an exemplary embodiment of the present invention and a voltage control according to the related art.

FIG. 5 is a graph showing a performance comparison between a voltage control based on a temperature according to an exemplary embodiment of the present invention and a voltage control according to the related art.

Referring to FIG. 5, graphs of temperature increase and maximum operating frequency before and after a voltage control based on a temperature are shown. As shown in the drawing, if the voltage is controlled according to the temperature, the speed of temperature increase declines, and thereby the maximum operating frequency and system performance can be maintained. Namely, if the voltage control is applied, the drive frequency of the system increases in a linear form according to the increase in temperature. The drive frequency at 100° C. shows a higher drive frequency compared to the case of not applying the voltage control based on a temperature. If the voltage control based on a temperature is not applied, the maximum drive frequency of the system rapidly decreases according to the decrease of the temperature. However if the voltage control based on a temperature is applied, the maximum drive frequency decreases relatively slowly, meaning that the system is operating at higher driver frequency.

Figure 6:
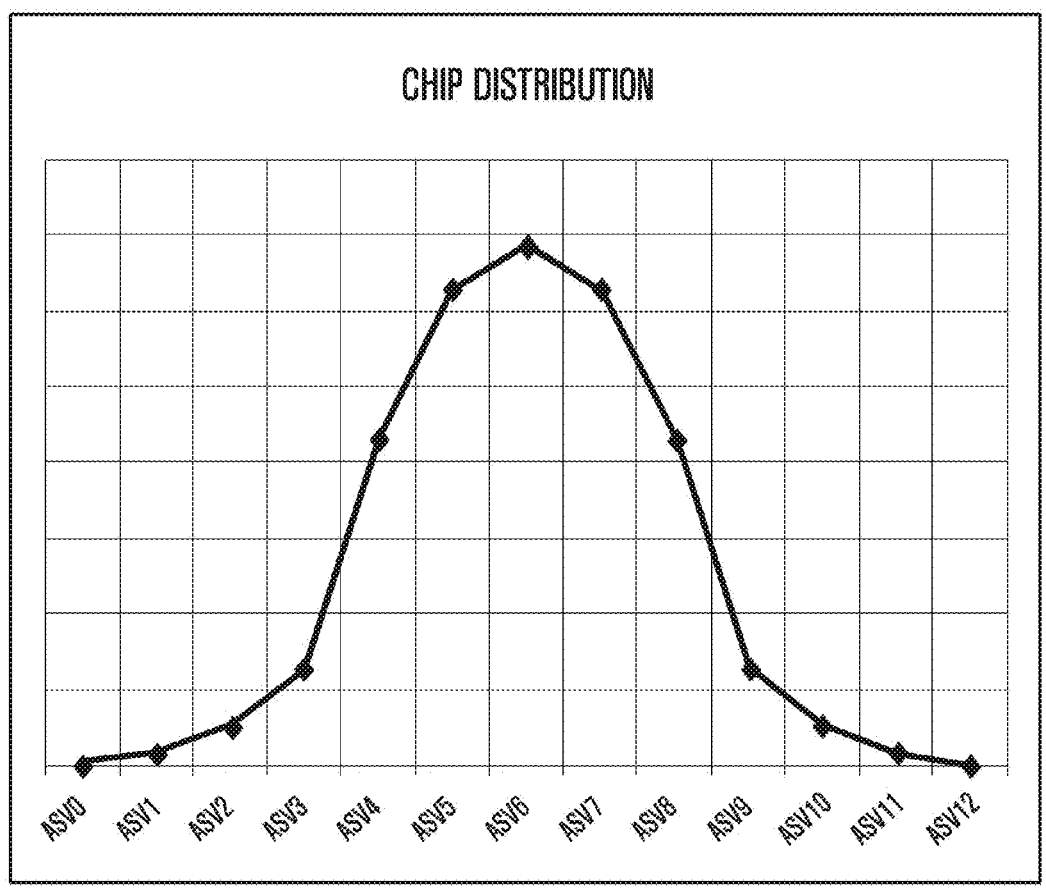
FIG. 6 is a graph showing an Adaptive Supply Voltage (ASV) group distribution of mass produced chips according to an exemplary embodiment of the present invention.

FIG. 6 is a graph showing an Adaptive Supply Voltage (ASV) group distribution of mass produced chips according to an exemplary embodiment of the present invention.

Referring to FIG. 6, generally in the mass production of a chip, a physical property of the chip has a normal distribution as shown. Chips distributed from the center to the direction of Adaptive Supply Voltage 0 (ASV0) require a higher voltage to give a specific performance and have a lower leakage and current consumption. Adversely, chips distributed from the center to the direction of Adaptive Supply Voltage 12 (ASV12) require a lower voltage to give the specific performance and have a higher leakage and current consumption. Chips distributed close to ASV12 are weak to heat because of high power consumption, and have a disadvantage of shorter battery lifetime. Chips distributed close to ASV0 have lower power consumption, however, have a disadvantage of low responsibility.

As described above, deviations of heat generation and operating time between the chips of group ASV0 and the chips of group ASV12 are great. If the differential voltage supply function according to the present invention is applied to the chips of groups ASV0 to ASV12, deviations of operating time between the chips can be reduced. For example, chips belonging to the group ASV12 have a characteristic of generating heat due to high power consumption, however, the heat generation can be reduced by applying the differential voltage supply function based on a temperature according to the present invention, and thereby the problems of heat generation and leakage current can be addressed. As a result, if the differential voltage supply function based on temperature is applied to mass production of a chip, the physical properties of samples can be compensated close to the group ASV6 distributed in the center, and thereby the present invention helps in the mass production of chips by extending an allowable range of the products. For example, if the product group has been divided into 12 groups originally, the product group may be divided into a smaller number of groups by applying the differential voltage supply function based on a temperature according to an exemplary embodiment of the present invention. In other words, the differential voltage supply function based on a temperature according to an exemplary embodiment of the present invention supports re-grouping the ASV groups based on a temperature. Accordingly, a plurality of groups may be allocated to a chip to perform the voltage control based on a temperature. This characteristic can result in manufacturing more products supporting a specific characteristic, and the products may be handled as having the same performance even though the physical properties of the products may differ.

FIGS. 7 to 10 are various tables and graphs showing test results of temperature characteristics of an actual mass produced chip according to an exemplary embodiment of the present invention. The drawings show test results of a chip, and "COLD Temp." indicates a result of a voltage margin test when a chip die temperature is between 0° C. to 39° C. "AMBIENT Temp." indicates a result of a voltage margin test when a chip die temperature is between 67° C. to 80° C. "L0" to "L15" indicate clock frequencies, where "L0" is the maximum operating frequency and "L15" is the minimum operating frequency. The measurement of the voltage margin is performed by using a vector, and voltages are measured by gradually reducing the actual supply voltage until a malfunction occurs. The test was performed by reducing the voltage at a 12.5 mV interval. The additional margin is calculated by subtracting the minimum operating voltage (in mV) of "AMBIENT Temp." from the minimum operating voltage (in mV) of "COLD Temp.".

Figure 8:
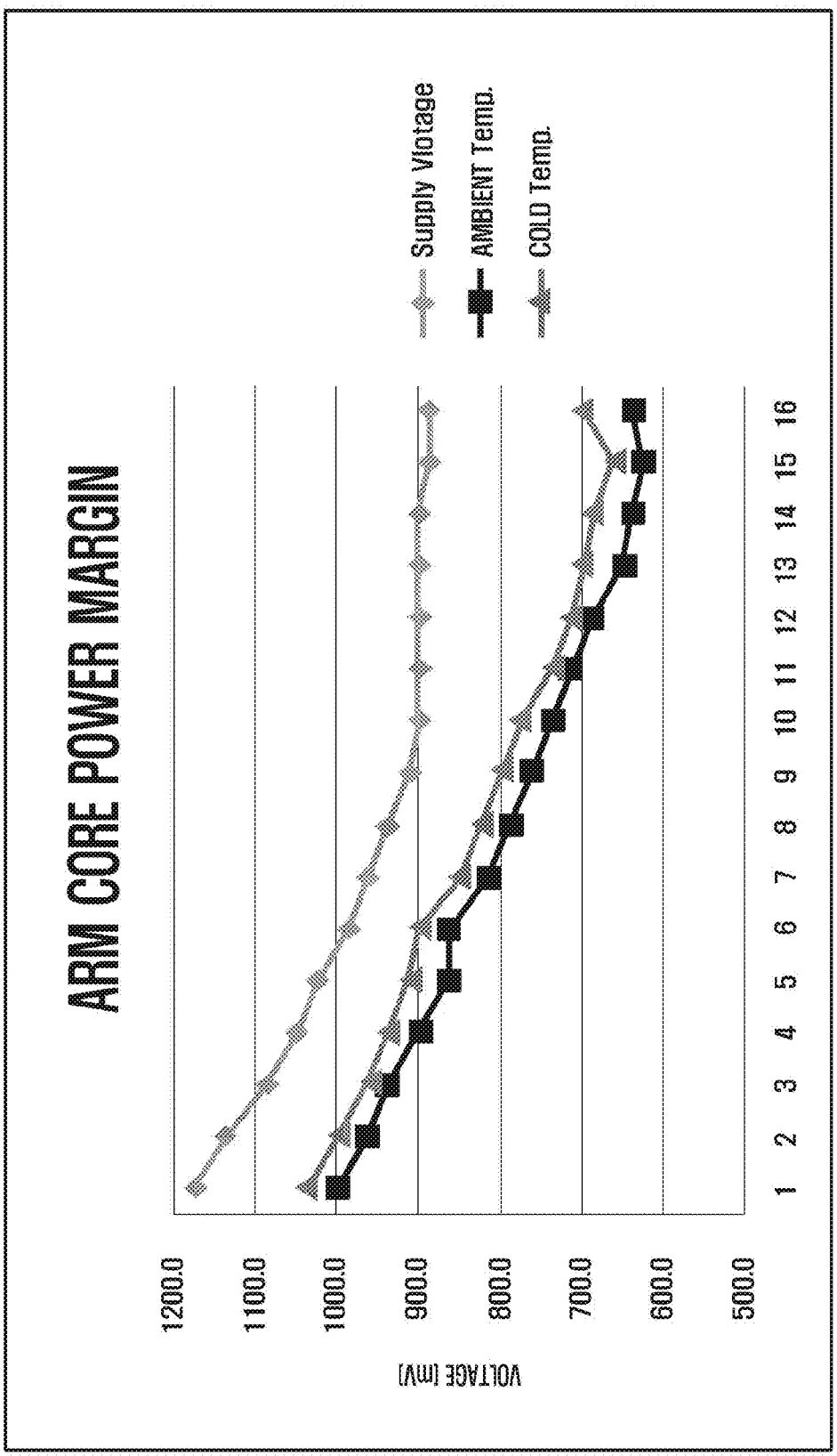
FIG. 8 is a graph showing ARM core power margins according to an exemplary embodiment of the present invention.
Figure 9:
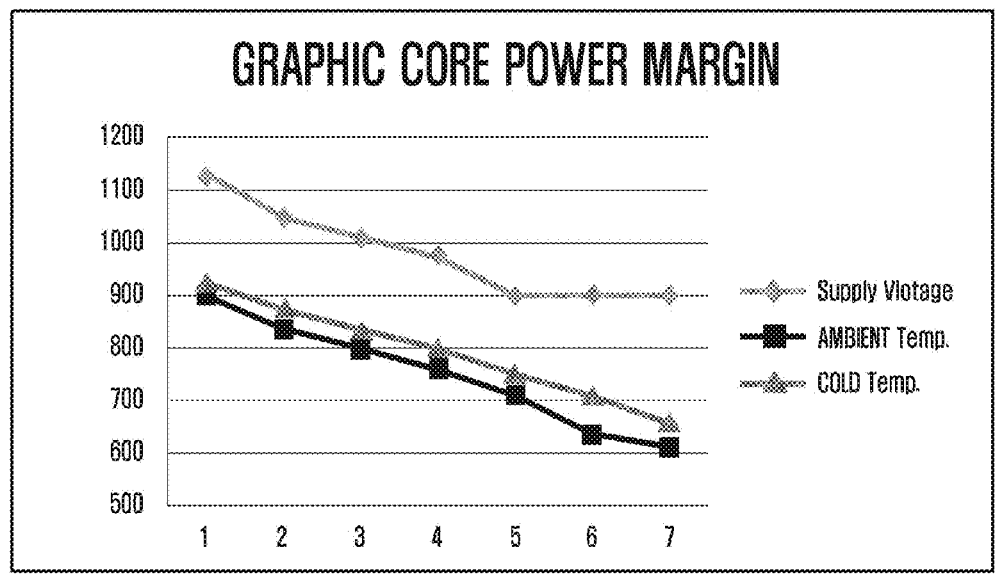
FIG. 9 is a graph showing graphic core margins according to an exemplary embodiment of the present invention.
Figure 10:
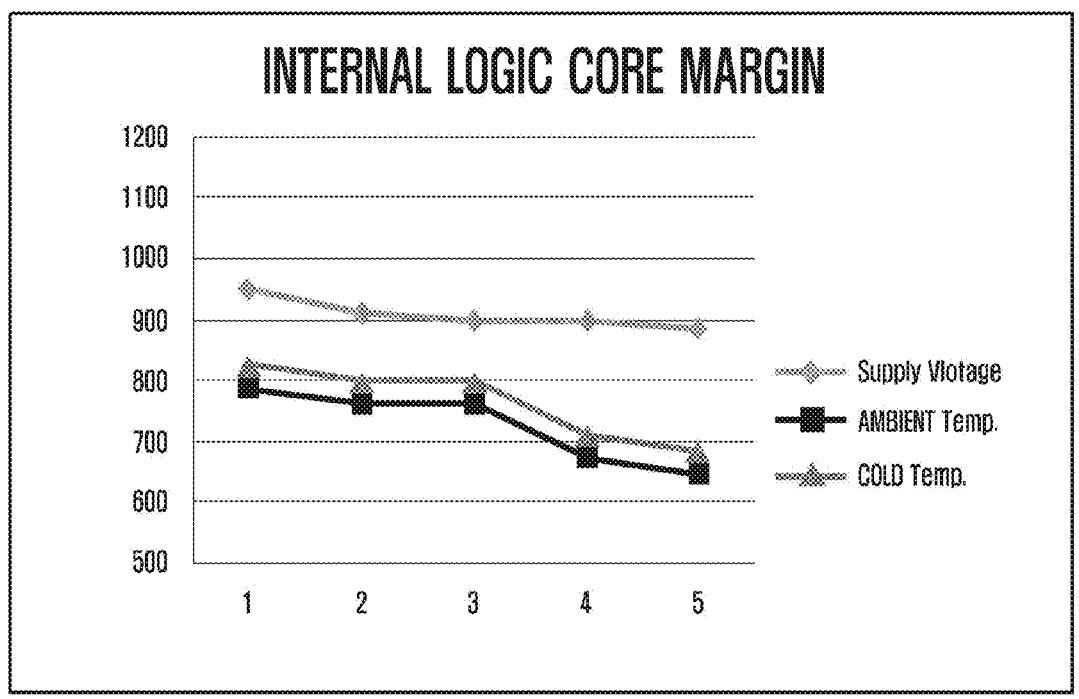
FIG. 10 is a graph showing internal logic power margins according to an exemplary embodiment of the present invention.

Referring to FIG. 7, the additional margin increases as the temperature increases in all the frequency range. Referring to FIG. 8, ARM core power margin is configured with 16 steps. Referring to FIG. 9, Graphic Core (G3D) power margin is configured with 7 steps. Referring to FIG. 10, Internal Logic (INT) power margin is configured with 5 steps. As shown in the drawings, the voltage may be reduced as much as an additional margin voltage generated according to the increase of temperature, and because additional margin is generated if the voltage is reduced, the voltage may be reduced further than the currently measured additional margin.

Referring to FIG. 11, a table shows a test result of measuring temperature voltage margins of ASV groups according to an exemplary embodiment of the present invention.

FIG. 11 is a test result of measuring 5 chips in 4 groups, and shows additionally generated margins as the temperature increases. As a result, the differential voltage supply function based on a temperature can be applied to all the groups because additional margins are generated for the whole range of the power in all the chips. For example, the voltage of each sample belonging to the illustrated ASV groups can be reduced as the temperature increases. Here, IDS is a value related to the leakage in a milliampere (mA) unit, and RPM corresponds to the maximum moving speed of electric charge.

As described above, exemplary embodiments of the present invention may be characterized to have a configuration providing a differential voltage supply function based on a temperature. The differential voltage supply function based on a temperature may be applied to perform a system operation based on a plurality of DVFS tables provided for each temperature if the corresponding system uses DVFS tables. Accordingly, exemplary embodiments of the present invention can provide a system to apply different voltages in the same frequency by using the plurality of DVFS tables. In exemplary embodiments, the present invention further supports to set a voltage according to the temperature by providing a plurality of ASV (INS) groups for each temperature of a chip.

In the method of detecting a temperature according to an exemplary embodiment of the present invention, a temperature sensor unit (TMU) disposed inside the system or chip, or a thermistor disposed on a PCB may be used, which can be applied also to a multi-core environment. As described above, exemplary embodiments of the present invention can reduce a leakage current and power consumption by supporting voltage adjustment according to a temperature increase even in a system using only a specific drive frequency without changing a voltage according to the frequency like the DVFS.

The terminal 100 may further include various additional modules according to a provision type. Namely, the terminal 100 may include components not described above, such as a near field communication module for a communication terminal, an interface for data transmission in a wired communication method or in a wireless communication method of the terminal 100, an internet communication module connecting to the internet and performing an internet function, a digital broadcast module receiving a digital broadcast and performing a play function, or the like. These components have a wide variation according to a trend of convergence, and thereby all the items cannot be listed here, however, a component having the same level as the above configuration may be further included in the above device. Of course, a specific component may be omitted or replaced by another one according to the provision type of the terminal 100 according to exemplary embodiments of present invention. Such would be obvious to a person having ordinary skill in the art.

The terminal 100 according to an exemplary embodiment of the present invention may include all the mobile communication terminals operating by communication protocols corresponding to various communication systems, Portable Multimedia Players (PMP), digital broadcast players, Personal Digital Assistants (FDA), music players (for example, MP3 player), portable game terminals, smart phones, information and communication equipment, and multimedia equipment such as notebooks and handheld PCs, and their application equipment.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A terminal supporting a voltage control based on a temperature, the terminal comprising:
    a temperature sensor for detecting a temperature of at least one location of the inside and of the outside of at least one system;
    a voltage control unit for adjusting the voltage supplied to the at least one system according to the temperature detected by the temperature sensor using a Dynamic Voltage Frequency Scaling (DVFS) table; and
    an internal clock detector for detecting a drive frequency of the system,
    wherein the DVFS table is selected from a plurality of DVFS tables based on the temperature, and each of the plurality of DVFS tables corresponds to a different temperature, and
    wherein the voltage control unit controls the voltage supplied to the system according to voltage information mapped with the drive frequency of a specific DVFS table selected from among the plurality of DVFS tables, based on the drive frequency and the temperature.

2. The terminal of claim 1, wherein the at least one system comprises at least one of an Application Processor (AP), an image data processing unit, a graphics supporting unit, and an internal logic for the terminal.

3. The terminal of claim 1, further comprising a storage unit storing the plurality of DVFS tables.

4. The terminal of claim 1, wherein the at least one system is one selected from among a plurality of Adaptive Supply Voltage (ASV) groups classified by mass produced chips, and belongs to a plurality of ASV groups according to a temperature voltage margin.

5. The terminal of claim 1, wherein the voltage control unit controls the voltage based on an individual temperature of each of the at least one system.

6. The terminal of claim 1, wherein the voltage control unit decreases the voltage to a predetermined voltage which is an amount corresponding to the increase of the temperature.

7. The terminal of claim 1, wherein the temperature sensor is at least one of a temperature sensor installed inside the system and a temperature sensor installed on a Printed Circuit Board (PCB) on which the system is disposed.

8. A method for controlling a voltage based on a temperature, the method comprising:
    detecting temperature information of at least one location of the inside and of the outside of at least one system; and
    adjusting a voltage supplied to the at least one system according to the detected temperature using a Dynamic Voltage Frequency Scaling (DVFS) table,
    wherein the DVFS table is selected from a plurality of DVFS tables based on the temperature, and each of the plurality of DVFS tables corresponds to a different temperature, and
    wherein the adjusting of the voltage comprises:
        detecting voltage information mapped with a drive frequency of a specific DVFS table selected from among the plurality of DVFS tables, based on the drive frequency detected by the internal clock detector and temperature information collected by the temperature sensor; and
        adjusting the voltage supplied to the system according to the detected voltage information.

9. The method of claim 8, wherein the at least one system comprises at least one of an Application Processor (AP), an image data processing unit, a graphics supporting unit, and an internal logic for the terminal.

10. The method of claim 8, wherein the at least one system is one selected from among a plurality of Adaptive Supply Voltage (ASV) groups classified by mass produced chips, and belongs to a plurality of ASV groups according to a temperature voltage margin.

11. The method of claim 8, wherein the adjusting of the voltage further comprises controlling the voltage based on an individual temperature of each of at least one system.

12. The method of claim 8, wherein the adjusting of the voltage further comprises decreasing the voltage to a predetermined voltage which is an amount corresponding to the increase of the temperature.

13. The method of claim 8, wherein the detecting of the temperature is performed by at least one of a temperature sensor installed inside the at least one system and a temperature sensor installed on a Printed Circuit Board (PCB) on which the at least one system is disposed.

14. At least one non-transitory processor readable medium for storing a computer program of instructions configured to be readable by at least one processor for instructing the at least one processor to execute a computer process for performing the method as recited in claim 8.

15. The terminal of claim 1, wherein a value of voltage included in each of the plurality of DVFS tables is decreased as a temperature corresponding to the each of the plurality of DVFS tables is increased.

16. The method of claim 8, wherein a value of voltage included in each of the plurality of DVFS tables is decreased as a temperature corresponding to the each of the plurality of DVFS tables is increased.

* * * * *